(12) United States Patent
Rouphael et al.

(10) Patent No.: US 6,400,317 B2
(45) Date of Patent: Jun. 4, 2002

(54) METHOD AND APPARATUS FOR ANTENNA CONTROL IN A COMMUNICATIONS NETWORK

(75) Inventors: Antoine J. Rouphael, Escondido, CA (US); Daniel Innis Riley, West Melbourne, FL (US); John Erich Hoffmann, Indialantic, FL (US); George Rodney Nelson, Jr., Merritt Island, FL (US); James Arthur Proctor, Jr., Indialantic, FL (US)

(73) Assignee: Tantivy Communications, Inc., Melbourne, FL (US)

( * ) Notice: Subject to any disclaimer, the term of this patent is extended or adjusted under 35 U.S.C. 154(b) by 0 days.

(21) Appl. No.: 09/776,397

(22) Filed: Feb. 2, 2001

Related U.S. Application Data

(63) Continuation-in-part of application No. 09/579,084, filed on May 25, 2000, now Pat. No. 6,304,215, which is a division of application No. 09/210,117, filed on Dec. 11, 1998, now Pat. No. 6,100,843, which is a continuation of application No. 09/157,736, filed on Sep. 21, 1998, now abandoned.

(51) Int. Cl.$^7$ ................................................. H04B 7/00
(52) U.S. Cl. ...................................................... 342/367
(58) Field of Search ........................ 342/81, 367, 368, 342/373

(56) References Cited

U.S. PATENT DOCUMENTS

| | | | |
|---|---|---|---|
| 5,574,466 A | * 11/1996 | Reed et al. | ................. 342/359 |
| 5,617,102 A | 4/1997 | Prater | |
| 5,856,804 A | * 1/1999 | Turcotte et al. | ............. 342/371 |
| 5,966,670 A | * 10/1999 | Keskitalo et al. | ........... 455/562 |
| 6,047,192 A | * 4/2000 | Maloney et al. | ............ 455/456 |
| 6,100,843 A | 8/2000 | Proctor, Jr. et al. | |

* cited by examiner

Primary Examiner—Dao Phan
(74) Attorney, Agent, or Firm—John L. DeAngelis, Jr.; Holland & Knight LLP

(57) ABSTRACT

An antenna apparatus for increasing the capacity in a cellular communication system. The antenna operates in conjunction with a mobile subscriber unit and provides a plurality of antenna elements, each coupled to a respective signal control component to provide a weight to the signal transmitted from each element. The weight for each antenna element is adjusted to achieve optimum reception during, for example, an idle mode when a pilot signal is received. The weight values cause the antenna array to create a beam former for signals to be transmitted from the mobile subscriber unit, and a directional receiving array to more optimally detect and receive signals transmitted from the base station. By directionally receiving and transmitting signals, multipath fading and intercell interference are greatly reduced. The weights are adjusted at the transmitting site in accord with signal quality metric information determined at the receiving site. The signal quality metric information is returned to the transmitting site where the optimum signal quality metric is determined. The weights at the transmitting site are then set to provide the antenna directional angle represented by the optimum signal quality metric.

33 Claims, 3 Drawing Sheets

METHOD AND APPARATUS FOR ANTENNA CONTROL IN A COMMUNICATIONS NETWORK

CROSS-REFERENCE TO RELATED APPLICATIONS

This application is a Continuation-In-Part of U.S. patent application Ser. No. 09/579,084 filed May 25, 2000 entitled "Adaptive Antenna For Use In Same Frequency Networks," now U.S. Pat. No. 6,304,215, which is a divisional application of Ser. No. 09/210,117 filed Dec. 11, 1998 of U.S. Issued Pat. No. 6,100,843 entitled "Adaptive Antenna for use in Same Frequency Networks," which is a continuation application of U.S. patent application Ser. No. 09/157,736 filed Sep. 21, 1998 now abandoned entitled "Method and Apparatus Providing an Adaptive Antenna For Use in Same Frequency Networks," the entire teachings of which are incorporated herein by reference.

FIELD OF THE INVENTION

This invention relates to mobile (or portable) cellular communication systems, and more particularly to an antenna apparatus for use by mobile subscriber units to provide beam forming transmission and reception capabilities.

BACKGROUND OF THE INVENTION

Code division multiple access (CDMA) communication systems provide wireless communications between a base station and one or more mobile subscriber units. The base station is typically a computer controlled set of transceivers that are interconnected to a land-based public switched telephone network (PSTN). The base station includes an antenna apparatus for sending forward link radio frequency signals to the mobile subscriber units. The base station antenna also receives reverse link radio frequency signals transmitted from each mobile unit. Each mobile subscriber unit also contains an antenna apparatus for the reception of the forward link signals and for transmission of the reverse links signals. A typical mobile subscriber unit is a digital cellular telephone handset or a personal computer coupled to a cellular modem. In CDMA cellular systems, multiple mobile subscriber units may transmit and receive signals on the same frequency, but with different modulation codes, to distinguish signals sent to or received from individual subscriber units.

The most common type of antenna for transmitting and receiving signals at a mobile subscriber unit is a monopole or omnidirectional antenna. This type of antenna consists of a single wire or antenna element that is coupled to a transceiver within the subscriber unit. The transceiver receives reverse link signals to be transmitted from circuitry within the subscriber unit and modulates the signals onto a carrier signal at a specific frequency assigned to that subscriber unit. The modulated carrier signal is transmitted by the antenna element. Forward link signals received by the antenna element at a specific frequency are demodulated by the transceiver and supplied to processing circuitry within the subscriber unit.

The signal transmitted from a monopole antenna is omnidirectional in nature. That is, the signal is sent with the same signal strength in all directions in a generally horizontal plane. Reception of a signal with a monopole antenna element is likewise omnidirectional. A monopole antenna does not differentiate in its ability to detect a signal in one direction versus detection of the same or a different signal coming from another direction. Generally, a monopole antenna does not produce significant radiation in the azimuth direction. The antenna pattern is commonly referred to as a donut shape with the antenna element located at the center of the donut hole.

A second type of antenna that may be used by mobile subscriber units is described in U.S. Pat. No. 5,617,102. The system described therein provides a directional antenna comprising two antenna elements mounted on the outer case of a laptop computer, for example. The system includes a phase shifter attached to each element. The phase shifter may be switched on or off to effect the phase of signals transmitted or received during communications to and from the computer. By switching the phase shifters on and regulating the amount of phase shift imparted to the signals input thereto, the antenna pattern (which applies to both the receive and transmit modes) may be modified to provide a concentrated signal or beam in the selected direction. This is referred to as an increase in antenna gain or directionality. The dual element antenna of the cited patent thereby directs the transmitted signal into predetermined quadrants or directions to allow for changes in orientation of the subscriber unit relative to the base station, while minimizing signal loss due to the orientation change. In accordance with the antenna reciprocity theorem, the antenna receive characteristics are similarly effected by the use of the phase shifters.

CDMA cellular systems are also recognized as being interference limited systems. That is, as more mobile subscriber units become active in a cell and in adjacent cells, frequency interference becomes greater and thus error rates increase. As error rates increase, to maintain signal and system integrity, the operator must decrease the maximum data rates allowable. Thus, another method by which data rate can be increased in a CDMA system is to decrease the number of active mobile subscriber units, thus clearing the airwaves of potential interference. For instance, to increase the maximum available data rate by a factor of two, the number of active mobile subscriber units can be decreased by one half. However, this is rarely an effective mechanism to increase data rates due to the lack of priority assignments to the system users.

SUMMARY OF THE INVENTION

Problems of the Prior Art

Various problems are inherent in prior art antennas used on mobile subscriber units in wireless communications systems. One such problem is called multipath fading. In multipath fading, a radio frequency signal transmitted from a sender (either a base station or mobile subscriber unit) may encounter interference on route to the intended receiver. The signal may, for example, be reflected from objects, such as buildings that are not in the direct path of transmission, but that redirect a reflected version of the original signal to the receiver. In such instances, the receiver receives two versions of the same radio signal; the original version and a reflected version. Each received signal is at the same frequency, but the reflected signal may be out of phase with the original due to the reflection and consequent longer transmission path. As a result, the original and reflected signals may partially cancel each other out (destructive interference), resulting in fading or dropouts in the received signal, hence the term multipath fading.

Single element antennas are highly susceptible to multipath fading. A single element antenna has no way of determining the direction from which a transmitted signal is sent and cannot be tuned or attenuated to more accurately detect and receive a signal in any particular direction. Its directional pattern is fixed by the physical structure of the antenna components.

The dual element antenna described in the aforementioned reference is also susceptible to multipath fading, due to the symmetrical and opposing nature of the hemispherical lobes formed by the antenna pattern when the phase shifter is activated. Since the lobes created in the antenna pattern are more or less symmetrical and opposite from one another, a signal reflected in a reverse direction from its origin can be received with as much power as the original signal that is received directly. That is, if the original signal reflects from an object beyond or behind the intended receiver (with respect to the sender) and reflects back at the intended receiver from the opposite direction as the directly received signal, a phase difference in the two signals can create destructive interference due to multipath fading.

Another problem present in cellular communication systems is inter-cell signal interference. Most cellular systems are divided into individual cells, with each cell having a base station located at its center. The placement of each base station is arranged such that neighboring base stations are located at approximately sixty degree intervals from each other. In essence, each cell may be viewed as a six sided polygon with a base station at the center. The edges of each cell adjoin each other and a group of cells form a honeycomb-like image if each cell edge were to be drawn as a line and all cells were viewed from above. The distance from the edge of a cell to its base station is typically driven by the maximum amount of power that is to be required to transmit an acceptable signal from a mobile subscriber unit located near the edge of the cell to that cell's base station (i.e., the power required to transmit an acceptable signal a distance equal to the radius of one cell).

Intercell interference occurs when a mobile subscriber unit near the edge of one cell transmits a signal that crosses over the edge into a neighboring cell and interferes with communications taking place within the neighboring cell. Typically, intercell interference occurs when similar frequencies are used for communications in neighboring cells. The problem of intercell interference is compounded by the fact that subscriber units near the edges of a cell typically use higher transmit powers so that the signals they transmit can be effectively received by the intended base station located at the cell center. Consider that the signal from another mobile subscriber unit located beyond or behind the intended receiver may be arrive at the base station at the same power level, representing additional interference.

The intercell interference problem is exacerbated in CDMA systems, since the subscriber units in adjacent cells may typically be transmitting on the same frequency. For example, generally, two subscriber units in adjacent cells operating at the same carrier frequency but transmitting to different base stations will interfere with each other if both signals are received at one of the base stations. One signal appears as noise relative to the other. The degree of interference and the receiver's ability to detect and demodulate the intended signal is also influenced by the power level at which the subscriber units are operating. If one of the subscriber units is situated at the edge of a cell, it transmits at a higher power level, relative to other units within its cell and the adjacent cell, to reach the intended base station. But, its signal is also received by the unintended base station, i.e., the base station in the adjacent cell. Depending on the relative power level of two same-carrier frequency signals received at the unintended base station, it may not be able to properly identify a signal transmitted from within its cell from the signal transmitted from the adjacent cell. What is needed is a way to reduce the subscriber unit antenna's apparent field of view, which can have a marked effect on the operation of the forward link (base to subscriber) by reducing the apparent number of interfering transmissions received at a base station. A similar improvement is needed for the reverse link, so that the transmitted signal power needed to achieve a particular receive signal quality can be reduced.

BRIEF DESCRIPTION OF THE PRESENT INVENTION

The present invention provides an inexpensive antenna apparatus for use with a mobile or portable subscriber unit in a wireless same-frequency communications system, such as a CDMA cellular communications system.

The invention provides a mechanism and method for efficiently configuring the antenna apparatus to maximize the effective radiated and/or received energy. The antenna apparatus includes multiple antenna elements and a like number of adjustable weight control components. As is well known in the art, the weight control components are controllable to adjust the phase, amplitude and/or delay of the signal coupled to each of the antenna elements. The weight control components (e.g., phase shifter, delay line, amplifier with variable gain, switch) are thus jointly and independently operable to affect the direction of reverse link signals transmitted from the subscriber unit on each of the antenna elements and the direction of forward link signals transmitted to the subscriber unit.

It is well known to steer or adapt an antenna that comprises a plurality of elements to maximize a given signal quality metric, such as the signal to interference plus noise ratio (SINR). The array is steered or directed by changing the relative phase angle or amplitude (i.e., weight) between the signals input to each of the antenna elements. Typically, the antenna is adapted or steered to achieve a maximum signal quality metric while operating in the receive mode or to steer the beam to a selected direction for transmitting.

According to the teachings of the present invention, the transmit beam pattern from a transmitter (or transceiver) is optimized to achieve an optimal signal quality metric at a receiver (or transceiver). That is, the transmit beam is adapted or steered dependent on the signal received at the receiver. This approach is substantially different from the prior art that teaches adapting an antenna of a receiver in response to the received quality metric. According to the present invention, a first station transmits to a second station where a signal quality metric is measured. The first station scans a plurality of antenna directional angles and the second station measures the signal quality metric at each directional angle. The second station then communicates the signal quality metric information back to the first station where the optimum signal quality metric value is selected. This selected value is then correlated with the antenna directional angle that produced it and the antenna is steered to that directional angle for communicating with the second station. In lieu of sending the signal quality metric information for each directional angle, the second station can choose the optimum signal quality metric and transmit only the optimum value back to the first station. The second station can also transmit differential signal quality metric information in lieu of the absolute signal quality metric values. Also, the signal quality metric information can be sent to the first station as each value is determined or the values can be stored and sent later as a group. The second station can further check each of the signal quality metrics against a predetermined threshold and transmit back to the first station only those signal quality metric values that exceed the threshold.

Through the use of an array of antenna elements, each having a programmable weight control component for forming the antenna beam as desired, the antenna apparatus increases the effective transmit power per bit transmitted. Thus, the number of active subscriber units in a cell may remain the same while the antenna apparatus of this invention increases data rates for each subscriber unit beyond those achievable by prior art antennas. Alternatively, if data rates are maintained at a given rate, more subscriber units may become simultaneously active in a single cell using the antenna apparatus described herein. In either case, the capacity of a cell is increased, as measured by the sum total of data being communicated at any given time.

Forward link communications capacity can be increased as well, due to the directional reception capabilities of the antenna apparatus. Since the antenna apparatus is less susceptible to interference from adjacent cells, the forward link system capacity can be increased by adding more users or by increasing the cell radius.

With respect to the physical implementation of the antenna apparatus, one embodiment of the invention specifies that first, second, and third antenna elements are positioned at locations corresponding to corners of an equilateral triangle and are aligned orthogonal to a plane defined by the triangle. Other embodiments specify that first, second, third, and fourth antenna elements are positioned at locations corresponding to corners of a rectangle or square, with the fifth antenna element positioned at a location corresponding to a center of the rectangle or square.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
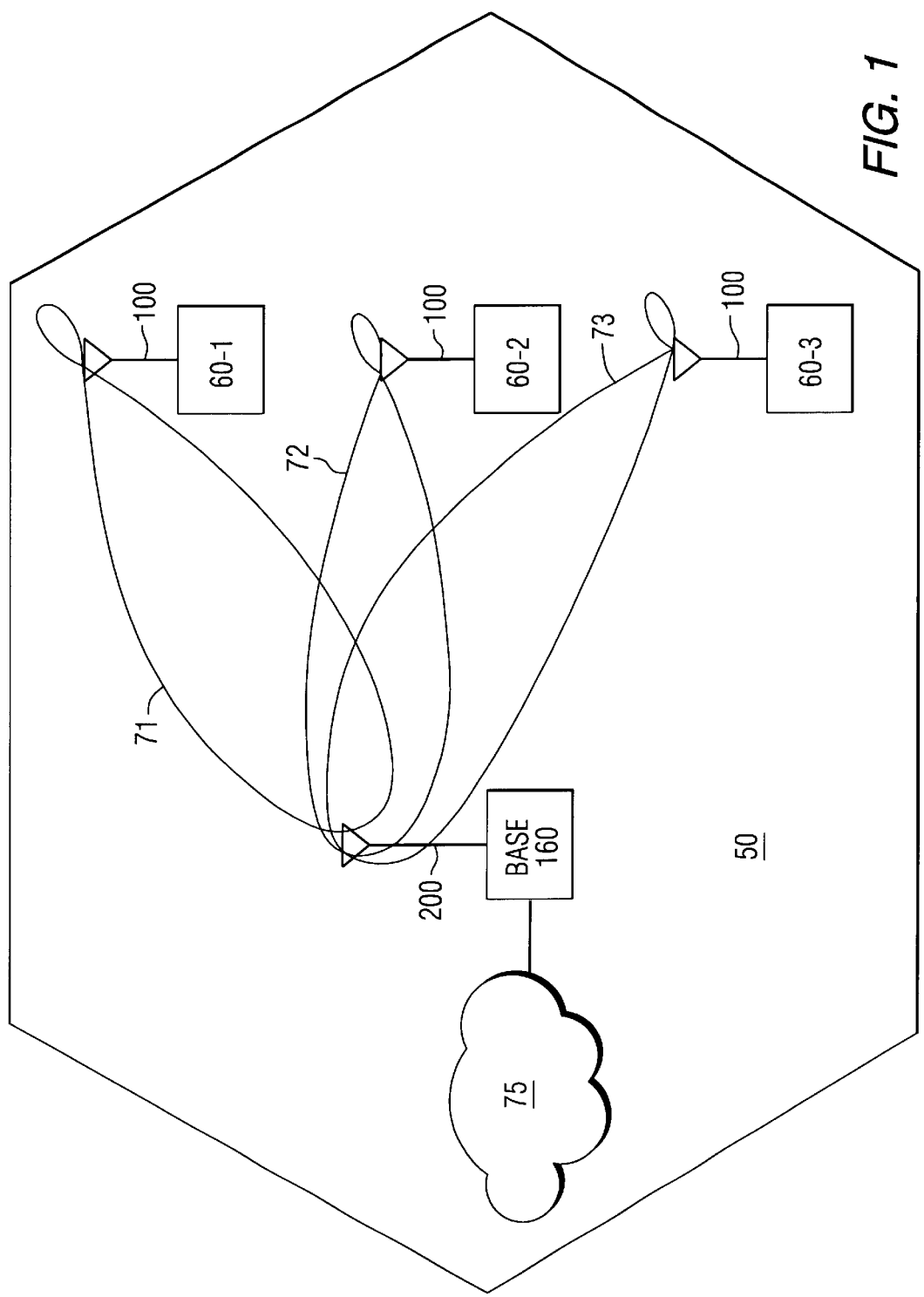
FIG. 1 illustrates a cell of a CDMA cellular communications system.

FIG. 1 illustrates one cell 50 of a typical CDMA cellular communication system. The cell 50 represents a geographical area in which mobile subscriber units 60-1 through 60-3 communicate with a centrally located base station 160. Each subscriber unit 60 is equipped with an antenna 100 configured according to the present invention. The subscriber units 60 are provided with wireless data and/or voice services by the system operator and can connect devices such as, for example, laptop computers, portable computers, personal digital assistants (PDAs) or the like through base station 160 to a network 75, which can be the public switched telephone network (PSTN), a packet switched computer network, such as the Internet, a public data network or a private intranet. The base station 160 can communicate with the network 75 over any number of different available communications protocols such as primary rate ISDN, or other LAPD based protocols such as IS-634 or V5.2, or even TCP/IP if network 75 is a packet based Ethernet network such as the Internet. The subscriber units 60 may be mobile in nature and may travel from one location to another while communicating with the base station 160. As the subscriber units leave one cell and enter another, the communications link is handed off from the base station of the exiting cell to the base station of the entering cell.

FIG. 1 illustrates one base station 160 and three mobile subscriber units 60 in a cell 50 by way of example only and for ease of description of the invention. The invention is applicable to systems in which there are typically many more subscriber units communicating with one or more base stations in an individual cell, such as the cell 50.

It is also to be understood by those skilled in the art that FIG. 1 may be a standard cellular type communications system employing signaling schemes such as a CDMA, TDMA, GSM or others in which the radio channels are assigned to carry data and/or voice between the base stations 104 and subscriber units 60. In a preferred embodiment, FIG. 1 is a CDMA-like system, using code division multiplexing principles such as those defined in the IS-95B standards for the air interface.

The invention provides the mobile subscriber units 60 with an antenna 100 that provides directional reception of forward link radio signals transmitted from the base station 160, as well as directional transmission of reverse link signals, via a process called beam forming, from the mobile subscriber units 60 to the base station 160. This concept is illustrated in FIG. 1 by the example beam patterns 71 through 73 that extend outwardly from each mobile subscriber unit 60 more or less in a direction for best propagation toward the base station 160. By being able to direct transmission more or less toward the base station 160, and by being able to directively receive signals originating more or less from the location of the base station 160, the antenna apparatus 100 reduces the effects of intercell interference and multipath fading for the mobile subscriber units 60. Moreover, since the transmission beam patterns 71, 72 and 73 extend outward in the direction of the base station 160 but are attenuated in most other directions, less power is required for transmission of effective communications signals from the mobile subscriber units 60-1, 60-2 and 60-3 to the base station 160.

Figure 2:
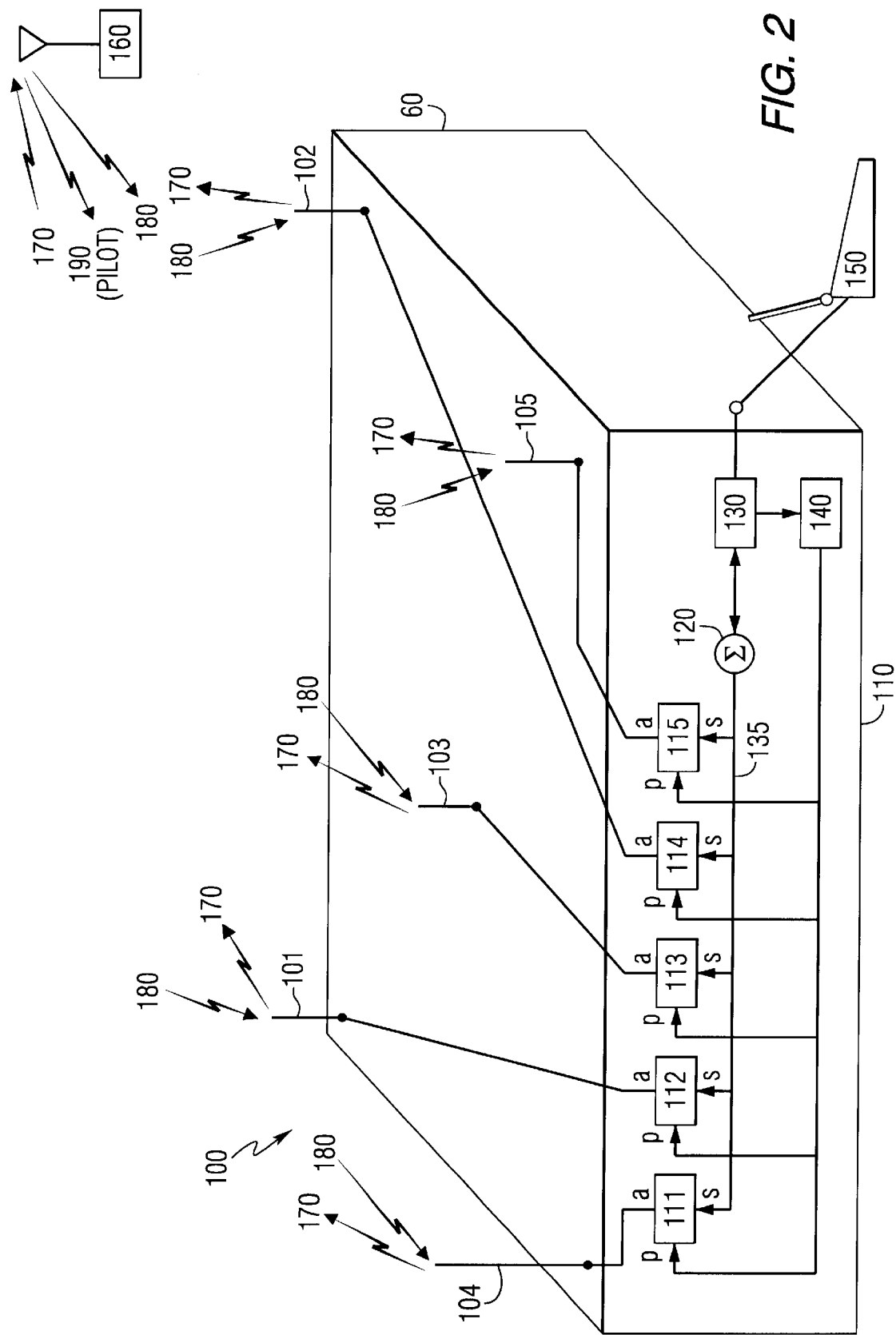
FIG. 2 illustrates a preferred configuration of an antenna apparatus used by a mobile subscriber unit in a cellular system according to this invention.

FIG. 2 illustrates a detailed isometric view of a mobile subscriber unit 60 and an associated antenna apparatus 100 configured according to one embodiment of the present invention. Antenna apparatus 100 includes a platform or housing 110 upon which are mounted five antenna elements 101 through 105. Within housing 110, the antenna apparatus 100 includes weight control components 111 through 115 for adjusting the amplitude, phase or both of the signal received or transmitted from each element 101 through 105, a bidirectional summation network or splitter/combiner 120, a transceiver 130, and a controller 140, which are all interconnected via a bus 135. As illustrated, the antenna apparatus 100 is coupled via the transceiver 130 to a laptop computer 150 (not drawn to scale). The antenna 100 allows the laptop computer 150 to perform wireless data communications via forward link signals 180 transmitted from the base station 160 and reverse link signals 170 transmitted to the base station 160.

In one embodiment, each antenna element 101 through 105 is disposed on the surface of the housing 110 as illustrated in FIG. 2. Here, four elements 101, 102, 104 and 105 are respectively positioned at locations corresponding to the corners of a rectangle (in one embodiment the rectangle is a square), and a fifth antenna element 103 is positioned at a location corresponding to the center of the rectangle. The distance between each element 101 through 105 is great enough so that the relationship between a signal received by more than one element 101 through 105 will be out of phase with other elements that also receive the same signal, assuming all elements 101 through 105 have the same setting for their respective weight control components 111 through 115.

However, according to the operation of the antenna 100 in this invention, the weight control components 111 through 115 are both dependently and independently adjustable to affect the directionality of signals to be transmitted and/or received to or from the subscriber unit 160 (i.e., the laptop computer 150 in this example). By properly adjusting the weight control components 111 through 115 (i.e., the weights) for each element 101 through 105, during signal transmission or reception, a composite beam is formed that is positionally directed toward the base station 160. That is, the optimal arrangement for the weight control components for sending a reverse link signal 170 from the antenna 100 is a setting for each antenna element 101 through 105 that creates a directional reverse link signal beam former. The result is an antenna 100 that directs a stronger reverse link signal pattern in the direction of the intended receiver base station 160, reducing the likelihood that an unintended base station in an adjacent cell will also receive the reverse link signal 170.

The weight control component settings used for transmission of signals over the reverse link 170 also cause the elements 101 to 105 to optimally receive forward link signals 180 transmitted from the base station 160, and reduce the reception of signals from other adjacent base stations. Due to the controllable nature and the independence of the weight control components for each antenna element 101 through 105, only forward link signals 180 arriving from a direction that is more or less in the location of the base station 160 are optimally received. The elements 101 through 105 naturally reject other signals that are not transmitted from proximate directions as are the intended forward link signals 180. In other words, a directional antenna is formed by adjusting the weight control components of each element 101 through 105.

The summation network 120 is coupled to the signal terminal S, of each weight control component 111 through 115. During transmission, the summation network 120 provides a reverse link signal to each of the weight control components 111 through 115. The weight control components 111 through 115 affect the correction of the reverse link signal by imparting a weight (in one embodiment, a phase shift) to the input signal, as determined by a control input signal P to each weight control component 111 through 115. Differentiating the reverse link signals 170 transmitted from each element 101 through 105 causes constructive or destructive interference with the signals transmitted from the other elements. In this manner, the interfering signals combine to form a strong composite beam for the reverse link signals 170 in the desired direction. The imparted weight provided to each antenna element 101 through 105 determines the direction in which the composite beam is transmitted.

The weight control components 111 through 115 used for transmission from each antenna element 101 through 105, also provide a similar effect on a forward link signal 180 that is received from the base station 160. That is, as each element 101 through 105 receives a signal 180 from the base station 160, (prior to the adjustment of the weight control components 111 through 115) the respective received signals are out of phase with each other due to the physical separation of the elements 101 through 105 on the base 110. However, each received signal is shifted by the weight control components 111 through 115. The adjustment brings each signal in phase with the other received signals 180. Accordingly, the signal quality metric associated with the composite received signal, produced by the summation network 120, is maximized.

To optimally establish the weight value for each of the weight control components 111 through 115, weight control values are provided by the controller 140. Generally, in the preferred embodiment, the controller 140 determines these optimum weights during idle periods when the laptop computer 150 is neither transmitting nor receiving payload or informational data via the antenna 100. When the subscriber unit 60 is operating in this idle state, a received signal, for example, a forward link pilot signal 190 that is continuously transmitted from the base station 160 and is received at each antenna element 101 through 105 serves as the basis for adjusting the weight control components 111 through 115 to optimize reception of the pilot signal 190, such as by maximizing the received signal energy or other link signal quality metric.

The controller 140 thus determines and sets an optimal weight for each weight control component 111 through 115, to optimize reception of the forward link pilot signal 190. When the antenna 100 enters an active mode for transmission or reception of signals between the base station 160 and the laptop 150, the weight as set by each of the weight control components 111 through 115 remains as set during the previous idle state.

Before a detailed description of the weight-setting computation as performed by the controller 140 is given, it should be understood that the invention is based in part on the observation that the location of the base station 160 relative to any one mobile subscriber unit (i.e., laptop 150) is approximately circumferential in nature. That is, if a circle is drawn around a mobile subscriber unit 60 and base station locations are assumed to have a minimum of one degree of granularity, the base station 160 can be located at 360 possible angular locations. The combination of the five weights, (one value for each of the weight control components 111 through 115) associated with each antenna element 101 through 105, optimizes the antenna pattern at an angular sector within the 360° circle. Minimal sector widths are attainable with the process according to the present invention for establishing the weight values.

Figure 3:
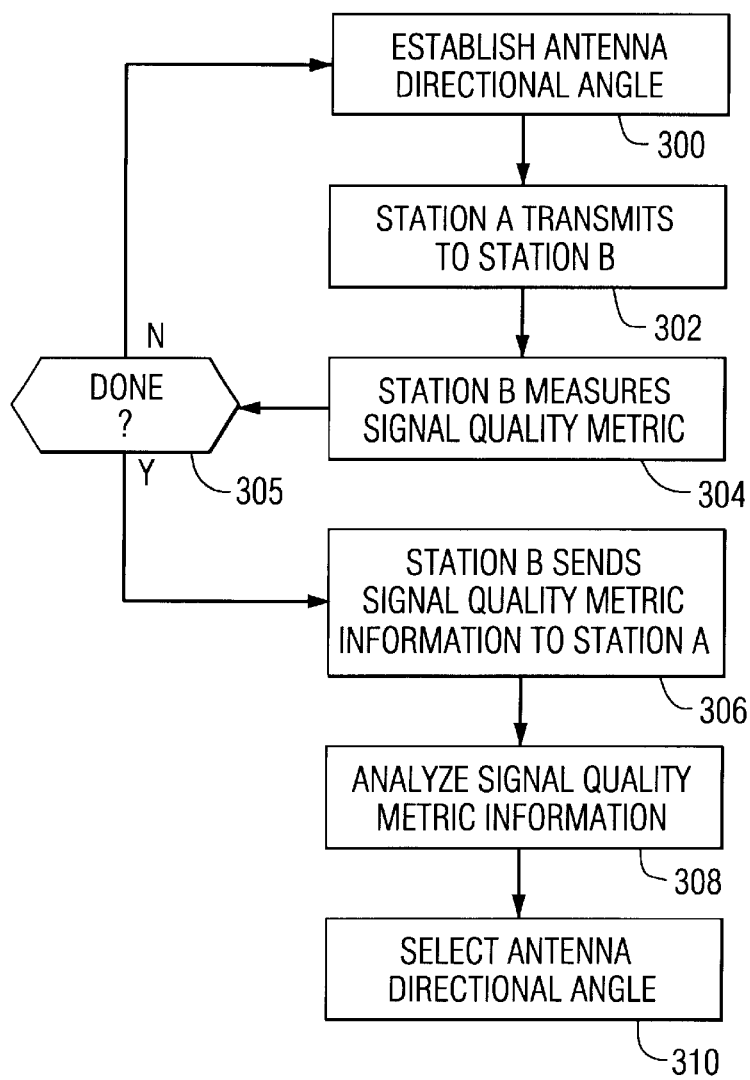
FIG. 3 is a flow chart of the processing steps performed to optimally set the weight values according to the teachings of the present invention.

Turning to FIG. 3 there is shown a process for determining the optimal directional angle for transmissions from a station A to a station B. The FIG. 3 process can occur during an active state of station A or during a standby state when station A is neither receiving nor transmitting informational signals (also referred to as payload data). The FIG. 3 process, whether executing in the idle or active state, can be triggered at a given frequency or in response to certain events occurring at station A, for example, when station A requests a channel assignment for transmitting to the station B. In any case, to effectively carry out the FIG. 3 process, the station A must transmit known data to station B so that the signal quality metric can be comparably evaluated at the latter site at each directional angle of the transmitting antenna. One preferable application for the teachings of the present invention is a wireless CDMA based network communications system where station A is one of a plurality of subscriber units communicating with a base station (i.e., station B). Finally, the FIG. 3 process can be executed by the controller 140 or by a dedicated general purpose microprocessor within the subscriber unit 60 or the lap top computer 150.

The FIG. 3 process begins at a step 300 where a directional angle is established for the antenna 100. As discussed herein above, the directional angle is controlled by weights associated with the signal transmitted from each of the antenna elements 101 through 105. The weights cause a change in the amplitude or phase (or both) of each element-transmitted signal and the collective signal is therefore steered or directed in a given direction. At a step 302 the station A transmits a known signal or data pattern to the station B. At a step 304 the station B measures a signal quality metric of the received signal. The signal quality metric can be selected from among: bit error rate, signal to noise ratio, signal to interference plus noise ratio, correlated power or the ratio of the energy in a chip to the interference. Following the step 304, the FIG. 3 process loops back to the step 300 via a decision step 305. The result from the decision step 305 is negative whenever there are additional antenna directional angles to be checked by the station A.

The stations A and B must coordinate the FIG. 3 process so each signal quality metric as measured at the station B is associated the proper directional angle of station A. In one embodiment, the station A transmits the current directional angle with the known data to station B. Then, when the signal quality metric information is measured at the station B, the directional angle information is appended to it or in some way associated with it for transmission back to the station A. In another embodiment, the station A transmits the initial directional angle and the differential angle between each directional angle. Knowing the starting point, the station B tracks the directional angles for which signal quality metric values are measured.

Returning to FIG. 3, if additional angles are yet to be checked, the FIG. 3 process returns to the step 300 where another directional angle is established by modifying the weights associated with the signals transmitted by each of the elements 101 through 105. The weight values can be modified by incrementing each one by a predetermined amount to move the beam to a different directional angle. In another embodiment, a plurality of vectors, the elements of which constitute the weights for each antenna element 101 through 105, can be successively applied to the weight control components 111 through 115 thus scanning the beam through the candidate directional angles.

When the decision step 305 returns a positive response, the FIG. 3 process proceeds to a step 306 where the station B sends the signal quality metric information to the station A. This process can be achieved by sending the raw values or by sending differential values back to the station A. Also, in another embodiment the signal quality metrics are evaluated at the station B and only those exceeding a predetermined threshold are returned to the station A. In this way, the amount of data required to be transmitted from the station B to the station A is limited. At a step 308, the station A analyzes the signal quality metric information to identify the optimal signal quality metric value. This analyses process is performed immediately after the data is returned from the station B or the signal quality metric information is stored at the station A for later retrieval and analyses. Once the optimum signal quality metric value is determined, the station A antenna element weights are set to achieve the antenna directional angle associated with the optimal signal quality at the station B. Advantageously, the transmit power required at the station A to produce an acceptable signal at the receiving station B is reduced due to the use of the optimum directional angle for the transmission.

In one application, the station A is one if a plurality of subscriber units in a CDMA (code division multiple access) network and the station B is a base station for communication with the plurality of subscriber units.

Alternatively, instead of incrementally varying the weight setting for each antenna element 101 through 105, the weight for each element can be stored in a table of vectors, each vector having five components representing the five weight control settings for the phase control components 101 through 105. The five weight values in each vector can be computed in advance to provide a given directional angle for the antenna 100. In operation, the antenna 100 scans through directional angles by selecting vectors for the candidate angles and applying the vector elements to the weight control components 111 through 115. Although the invention has been described in conjunction with a five element antenna, those skilled in the art will recognize that the teachings of the present invention can be easily scaled to any number of antenna array elements.

The antenna apparatus in preferred embodiments of the invention is inexpensive to construct and greatly increases the capacity in a CDMA interference limited system. That is, the number of active subscriber units within a single cell in a CDMA system is limited in part by the number of frequencies available for use and by signal interference limitations that occur as the number of frequencies in use increases. As more frequencies become active within a single cell, interference imposes maximum limitations on the number of users who can effectively communicate with the base station. Intercell interference also contributes as a limiting factor to cell capacity. Given the ability of the present invention to converge quickly, by using the coarse and fine processes, provides quick and accurate adaptation of a mobile subscriber unit to changes in the angle and location relative to the base station 160.

Since this invention adaptively eliminates interference from adjacent cells and selectively directs transmission and reception of signals from each mobile unit equipped with the invention to and from the base station, an increase in the number of users per cell is realized. Moreover, the invention reduces the required transmit power for each mobile subscriber unit by providing an extended directed beam towards the base station.

Alternative physical embodiments of the antenna include a four element antenna wherein three of the elements are positioned at corners of an equilateral triangular plane and are arranged orthogonally and extend outward from that plane. The fourth element is similarly situated but is located in the center of the triangle. Further, the teachings of the present inventions are applicable to an antenna comprising a plurality of elements, where less than all of the elements are active elements, i.e., for radiating or receiving a signal; the other elements serving as parasitic elements to reflect, redirect or absorb some portions of the emitted signal to advantageously shape the transmitted beam in the transmit mode and similarly advantageously affect the receive beam pattern. The elements can be serve in either the active or parasitic mode as determined by an element controller.

Figure 4:
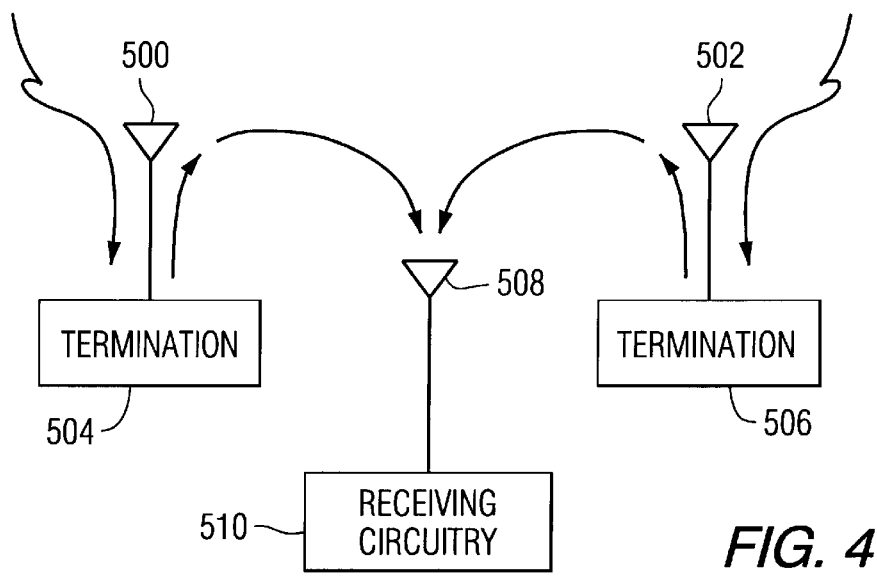
FIG. 4 illustrates a parasitic antenna array to which the teachings of the present invention can be applied.

FIG. 4 illustrates such an antenna embodiment including both parasitic and active elements. Parasitic elements 500 and 502 are connected respectively to terminations 504 and 506. An active element 508 is connected to conventional receiving circuitry 510, such as that shown in FIG. 2. Although FIG. 5 illustrates two parasitic elements and a single active element, it is known by those skilled in the art that the fundamentals associated with FIG. 6 are extendable to n parasitic elements and m active elements. In one embodiment, for instance, the teachings of the present invention can be applied to four parasitic elements arranged at the corners of a rectangle and the active element at approximately the rectangle center.

In operation, a signal is received at each of the parasitic elements 500 and 502 as shown. The signal is then carried to the terminations 504, 506, respectively, and reflected back therefrom through the elements 500 and 502. The terminations 504 and 506 comprise any one of the following: a phase shifting device, a weight control component (such as the weight control components 111 through 115 of FIG. 2) an impedance termination and a switch. The terminations 504 and 506 control both the amplitude and phase, only the phase, or only the amplitude of the signal input thereto, and thereby produce a reflected signal having a certain relationship (i.e., amplitude and phase characteristics) with respect to the received signal. The reflected signals are radiated from the elements 500 and 502, and effectively combined upon receipt at the active element 508. It is seen that the FIG. 6 embodiment accomplishes these three primary objectives of an antenna array: receiving the signal at an element, imparting a phase or amplitude shift to the received signal and combining the received signals. Although the FIG. 6 configuration has been explained in the receiving mode, it is known by those skilled in the art that in accordance with the antenna reciprocity theorem a like a function is achieved in the transmit mode.

While this invention has been particularly shown and described with references to preferred embodiments, those skilled in the art will realize that various changes in form and details may be made therein without departing from the spirit and scope of the invention as defined by the appended claims. Those skilled in the art will recognize or be able to ascertain using no more than routine experimentation, many equivalents to the specific embodiments of the invention described herein. For example, there can be alternative mechanisms for determining the proper weights for each antenna element, such as storing weights in a linked list or a database instead of a table. Moreover, those skilled in the art of radio frequency measurement techniques understand there are various ways to detect the angle of arrival and signal quality metrics of a signal, such as the received pilot signal. These mechanisms for determining the signal angle of arrival and signal quality metrics are meant to be contemplated for use by this invention. Once the location is then known, the proper weights for weight control components may be quickly obtained. Such equivalents are intended to be encompassed within the scope of the claims.

What is claimed is:

1. A method for optimizing the directional angle of an antenna of a first transceiver for communicating with a second transceiver, said method comprising the steps of:

(a) establishing a directional angle for the antenna at the first transceiver;

(b) transmitting a known signal from the first transceiver to the second transceiver;

(c) receiving the known signal at the second transceiver;

(d) at the second transceiver, determining a signal quality metric of the known signal;

(e) repeating the steps (a) through (d) wherein a different antenna directional angle is established for each execution of the step (a) and therefore a different signal quality metric is determined for each execution of the step (d);

(f) providing to the first transceiver information representative of the signal quality metrics determined at each execution of the step (d); and (g) determining an optimum directional angle for the antenna at the first transceiver based on the signal quality metric values determined at each execution of the step (d).

2. The method of claim 1 wherein the first transceiver is in a standby state during which no information is communicated between the first and the second transceivers.

3. The method of claim 2 wherein the known signal is a pilot signal.

4. The method of claim 1 wherein the first transceiver is in an active state during which information signals are transmitted and received thereby, and wherein the known signal is transmitted during periods when no information signal is being transmitted from the first transceiver to the second transceiver.

5. The method of claim 1 wherein the step (f) includes providing the signal quality metric information.

6. The method of claim 1 wherein the step (f) includes providing information related to the difference between the determined signal quality metric and a predetermined threshold value therefor.

7. The method of claim 1 wherein the repetitions of the steps (a) through (d) continue for a predetermined time.

8. The method of claim 1 wherein the repetitions of the steps (a) through (d) continue until a plurality of signal quality metrics for a like plurality of antenna directional angles have been determined.

9. The method of claim 1 wherein the antenna of the first transceiver comprises a plurality of antenna elements and a like plurality of signal control components for adjusting the signal weights for each one of the plurality of antenna elements to establish directional angles for the antenna at the step (a).

10. The method of claim 1 wherein the signal weights are associated with the signal amplitude.

11. The method of claim 1 wherein the signal weights are associated with the signal phase.

12. The method of claim 1 wherein the signal quality metric is the signal to noise ratio.

13. The method of claim 1 wherein the signal quality metric is selected from among the ratio of the signal energy to the interference, the ratio of the signal energy to the thermal noise and the ratio of the signal energy to the sum of the interference and the thermal noise.

14. The method of claim 1 wherein the first transceiver comprises a subscriber unit from among a plurality of subscriber units operative in a wireless communication network and wherein the second transceiver comprises a base station for communicating with the plurality of subscriber unit.

15. A method for optimizing the directional angle of a subscriber unit in a wireless communications system for communicating with a base station, said method comprising the steps of:

(a) during an idle state, establishing a directional angle for an antenna of the subscriber unit;

(b) transmitting a known signal from the subscriber unit to the base station;

(c) receiving the known signal at an antenna of the base station;

(d) at the base station, determining a signal quality metric of the known signal;

(e) repeating the steps (a) through (d) wherein a different antenna directional angle is established for each execution of the step (a), and therefore a different signal quality metric is determined for each execution of the step (d);

(f) providing information from the base station to the subscriber unit, wherein the information is representative of the signal quality metric of the known signal to the subscriber unit for each execution of the step (d); and (g) determining an optimum directional angle for the antenna at the subscriber unit based on the signal quality metrics for each execution of the step (d).

16. A wireless communications system for communicating between a first transceiver and a second transceiver, said wireless communications system comprising:

at the first transceiver, a plurality of antenna elements for transmitting and receiving a composite beam;

a like plurality of weight control components at the first transceiver, each respectively coupled to one of said plurality of antenna elements;

said plurality of weight control components operable to establish a directional antenna angle at the first transceiver for communicating with the second transceiver;

a transmitter at the first transceiver for transmitting a signal to the second transceiver;

a receiver at the second transceiver for determining a signal quality metric of the received signal;

a module at the second transceiver for providing the signal quality metric information to the first transceiver;

wherein said plurality of weight control components are responsive to the signal quality metric information for establishing an optimal antenna directional angle at the first transceiver for communicating with the second transceiver.

17. The wireless communications system of claim 16 wherein the weight control components are phase shifters for imparting phase shift to the signal input thereto.

18. The wireless communications system of claim 16 wherein the weight control components impart a weight to the signal input thereto and wherein the weight is associated with the signal amplitude, the signal phase or the signal amplitude and phase.

19. The wireless communications system of claim 16 wherein a predetermined number of the plurality of antenna elements are active elements and the remainder of the plurality of the antenna elements are parasitic elements.

20. The wireless communications system of claim 16 wherein the optimal configuration for the weight control components maximizes the signal power to interference ratio.

21. The wireless communications system of claim 16 wherein the optimal configuration for the weight control components minimizes the bit error rate.

22. The wireless communications system of claim 16 wherein the optimal configuration for the weight control components maximizes the received power.

23. The wireless communications system of claim 16 wherein the optimal configuration of the weight control components for a signal transmitted from the first transceiver to the second transceiver in the wireless communications system reduces emissions in a direction of other transceivers not intended to receive the signal.

24. The wireless communications system of claim 16 wherein the first transceiver is a subscriber unit and wherein the second transceiver is a base station for communicating with a plurality of subscriber units in the wireless communications system, and wherein the optimal configuration for the weight control components for a signal transmitted from said subscriber unit reduces interfering emissions at other ones of said plurality of subscriber units not intended to receive the signal.

25. An antenna apparatus for use with a first transceiver operative in a wireless communications system, for communicating with a second transceiver operative in the wireless communication system, said antenna apparatus comprising:

a plurality of antenna elements for transmitting and receiving a composite beam;

a like plurality of weight control components, each respectively coupled to one of said plurality of antenna elements; and each one of said plurality of weight control components controllable for imparting a weight to the signal at the associated antenna element and thereby establishing a directional antenna angle at the first transceiver for communicating with the second transceiver;

wherein the first transceiver transmits a signal to the second transceiver at the directional antenna angle;

wherein the second transceiver receives the signal and determines a signal quality metric associated therewith;

wherein the signal quality metric is returned to the first transceiver; and wherein said plurality of weight control components are responsive to the signal quality metric for establishing the directional antenna angle.

26. The antenna apparatus of claim 25, wherein the first transceiver is a one of a plurality of subscriber units and wherein the second transceiver is one of a plurality of base stations, each of the plurality of base stations for bi-directionally communicating with the plurality of subscriber units, wherein the optimal configuration for the weight control components of the subscriber unit creates a directional receiving antenna to optimally detect a signal sent from an intended base station and to suppress signals received from other than the intended base station.

27. The antenna apparatus of claim 26, wherein the optimal configuration for the weight control components of the subscriber unit creates a directional transmitting antenna to optimally transmit a signal to the intended base station and to reduce interfering emissions at other than the intended base station.

28. The apparatus of claim 25 wherein the plurality of antenna elements includes first, second, third, fourth, and fifth antenna elements, and wherein the plurality of weight control components includes first, second, third, fourth, and fifth weight control components, each respectively coupled to the first, second, third, forth and fifth antenna elements.

29. The antenna apparatus of claim 28, wherein the first, second, third, and fourth antenna elements are positioned at locations corresponding to the corners of a rectangle, and the fifth antenna element is positioned at a location corresponding approximately to the center of the rectangle.

30. The antenna apparatus of claim 25 wherein the adjustment of the weight control components occurs when the subscriber unit is in an idle state.

31. The antenna apparatus of claim 25 wherein the adjustment of the weight control components occurs when the subscriber unit is in an active state.

32. The antenna apparatus of claim 25 further comprising a summation network coupled to the plurality of the weight control components, in a transmit mode, said summation network providing a signal to each of the weight control components for transmission from the first transceiver via the plurality of antenna elements, and in a receive mode, said summation network receiving and combining the signals from each of the weight control components via the plurality of antenna elements into a received signal.

33. The antenna apparatus of claim 25 wherein the plurality of antenna elements comprises a first plurality of parasitic elements and at least one active element, wherein the weight is imparted to the signal associated with each of the first plurality of parasitic elements for producing a parasitic signal in response thereto, wherein the parasitic signal is radiated from each of the first plurality of parasitic elements and combined at the at least one active element.

* * * * *

UNITED STATES PATENT AND TRADEMARK OFFICE
CERTIFICATE OF CORRECTION

PATENT NO.    : 6,400,317 B2
DATED         : June 4, 2002
INVENTOR(S)   : Antione J. Rouphael et al.

It is certified that error appears in the above-identified patent and that said Letters Patent is hereby corrected as shown below:

Column 11,
Line 66, change "FIG. 5" to -- FIG. 4 --.

Column 12,
Lines 1, 23 and 27, change "FIG. 6" to -- FIG. 4 --.

Signed and Sealed this

Twenty-eighth Day of January, 2003

JAMES E. ROGAN
*Director of the United States Patent and Trademark Office*